Dec. 29, 1959  W. A. MARRISON  2,919,358
APPARATUS FOR CONVERTING RADIANT ENERGY TO
ELECTROMECHANICAL ENERGY
Filed March 23, 1955  3 Sheets-Sheet 1

INVENTOR
W. A. MARRISON
BY Harry C. Hart
ATTORNEY

Dec. 29, 1959  W. A. MARRISON  2,919,358
APPARATUS FOR CONVERTING RADIANT ENERGY TO
ELECTROMECHANICAL ENERGY
Filed March 23, 1955  3 Sheets-Sheet 2
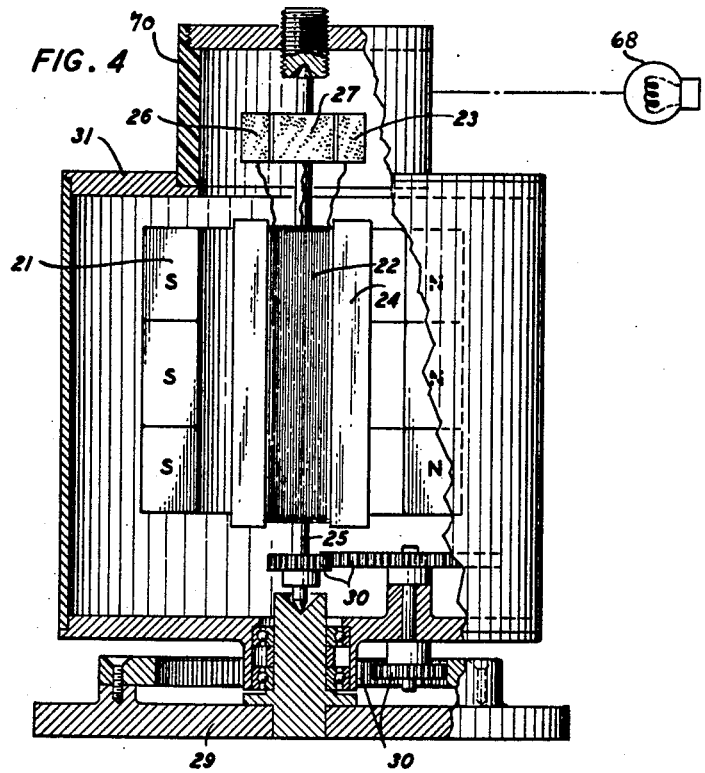
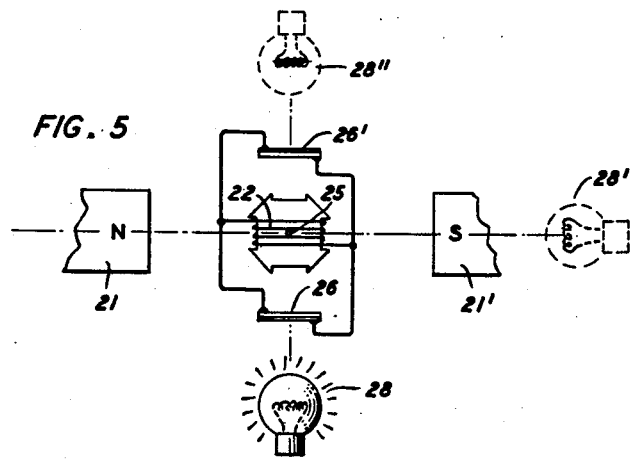
INVENTOR
W. A. MARRISON
BY Harry C. Hart
ATTORNEY Dec. 29, 1959 W. A. MARRISON 2,919,358
APPARATUS FOR CONVERTING RADIANT ENERGY TO
ELECTROMECHANICAL ENERGY
Filed March 23, 1955 3 Sheets-Sheet 3

INVENTOR
W. A. MARRISON
BY Harry C. Hart
ATTORNEY

United States Patent Office 2,919,358
Patented Dec. 29, 1959

2,919,358

APPARATUS FOR CONVERTING RADIANT ENERGY TO ELECTROMECHANICAL ENERGY

Warren A. Marrison, Berkeley Heights, N.J., assignor to Bell Telephone Laboratories, Incorporated, New York, N.Y., a corporation of New York Application March 23, 1955, Serial No. 496,222

11 Claims. (Cl. 310—46)

This invention relates to the conversion of radiant energy into electromechanical energy.

It is well known that certain devices, when excited by radiant energy, convert a part of this radiant energy into electrical energy. The high frequency of radiant energy relative to that of mechanical motions makes mechanical application of such energy convenient through conversion into unidirectional electrical energy. Prior mechanical utilization of this radiant energy phenomenon, therefore, has been burdened by the relative delicacy of conventional commutators with their resultant high manufacturing costs and troublesome maintenance problems.

As a consequence, electroemission by radiantly excited sources has been employed primarily to control relay type switches, which, in turn, control other power supplies, ultimately to provide controlled mechanical energy. Such systems contain many parts, several of which move in contact with others. These moving parts must suffer in varying degrees from mechanical unreliability and a multiplicity of parts makes for high costs. Further, the very nature of an On-Off mechanism, as is the relay, makes its ability to control either coarse and subject to hunting or unduly complicated by feedback loops.

In the light of these difficulties then, it is an object of this invention to provide a simple, reliable means for converting radiant energy into electromechanical energy. It is a further object of this invention to provide a simple reliable means whereby a radiant energy power source may serve as its own control source. The invention achieves these objects by utilizing a portion of the mechanical energy derived from an electromechanical converter to vary the incidence upon an electrically responsive surface of the radiant energy from which the converter derives its driving electrical energy.

The invention will be fully apprehended from the following detailed description of preferred illustrative embodiments thereof taken in connection with the appended drawings, in which:

Fig. 4 shows a mechanical variant extending the functions of the embodiment of Fig. 1;

Fig. 5 is a diagrammatic illustration of the sense-control inherent in the invention as employed in the system of Fig. 4;

Figure 6:
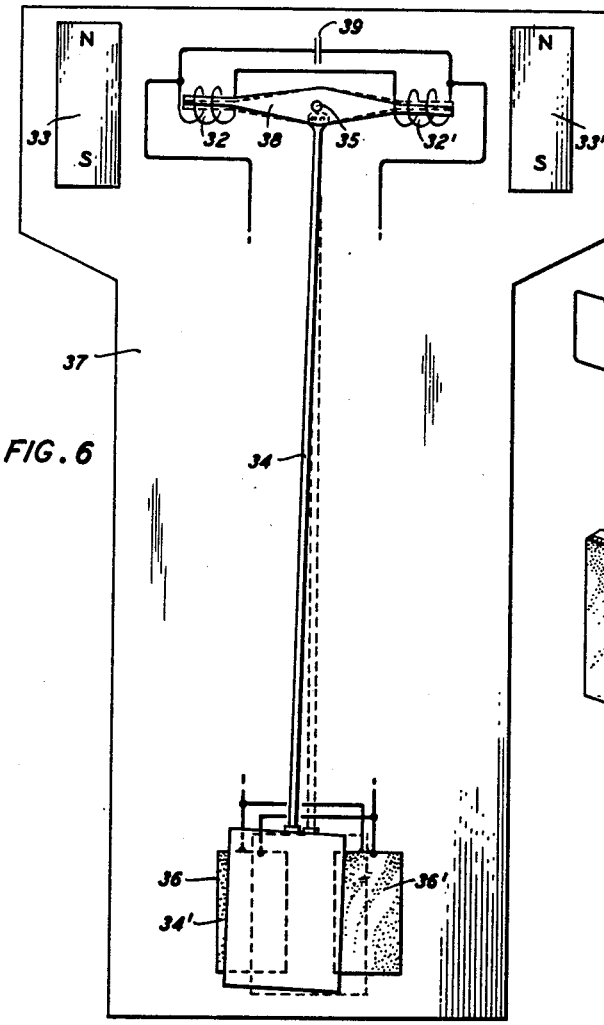
Fig. 6 shows an oscillatory embodiment of the invention.
Figure 7:
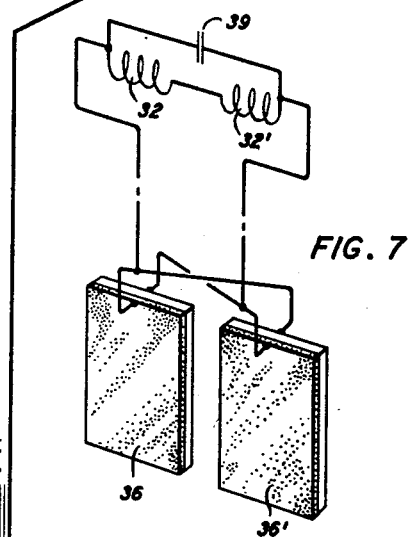

Fig. 7 schematically details the electrical connections of Fig. 6; and

Figure 8:
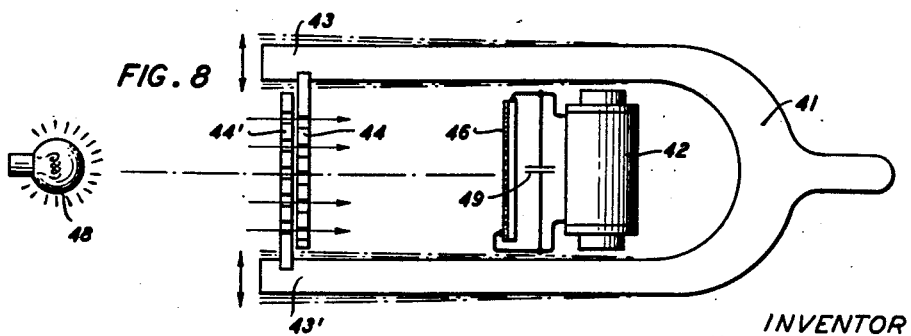

Fig. 8 pictures a form of the invention adapted to driving transverse-oscillatory systems.

Figure 1:
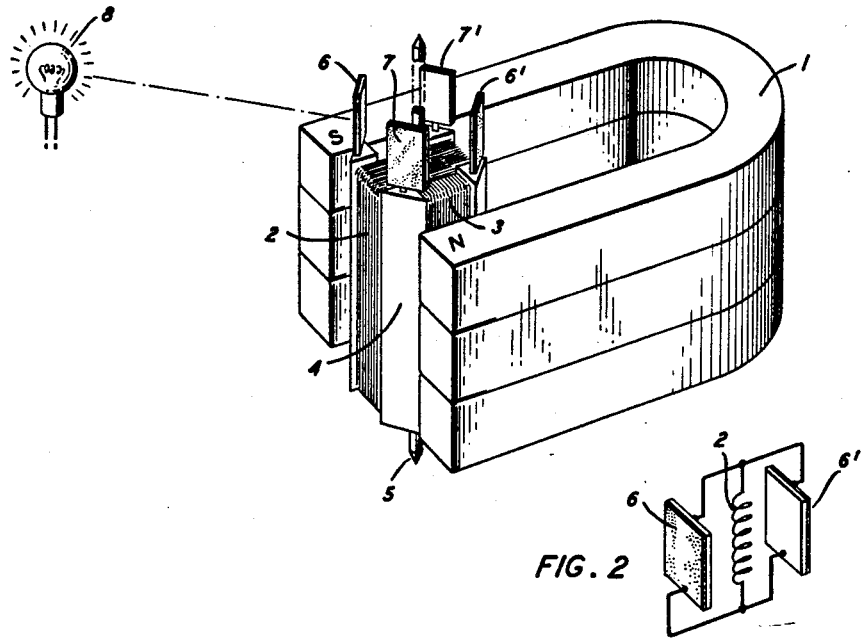
Fig. 1 shows an electric motor embodying the invention.

Looking now in more detail to the drawings, Fig. 1 shows a permanent magnet 1 in the field of which are current-conducting coils 2 and 3, wound on an armature 4. This armature 4 in turn is mounted for rotation about an axis 5. Atop the armature 4 are four photocells 6 and 6', 7 and 7', for example, photocells such as disclosed in a pending application of D. M. Chapin, C. S. Fuller and G. L. Pearson, Serial No. 414,273, filed March 5, 1954, now U.S. Patent No. 2,780,776 granted February 5, 1957, mounted in pairs 6 and 6' and 7 and 7', to face oppositely, each pair having its component photocells connected with opposite polarity to its associated coil 2 or 3.

Figure 2:
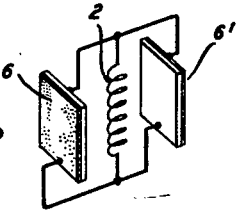
Fig. 2 is a schematic diagram showing the basic electric circuit employed in the device of Fig. 1.

This connection is shown schematically for one pair of photocell elements, 6 and 6', and one coil 2 in Fig. 2. In this Fig. 2 the stippled faces of the photocells represent positive terminals and the unstippled faces represent negative terminals.

Returning to the principal Fig. 1, and for simplicity's sake confining attention to one coil 2 and one pair of photocell elements 6 and 6', a light source 8 illuminates the pair of photocell elements 6 and 6'. By the rotational position of the armature 4, however, only the sensitive or positive side of cell 6 is illuminated while the insensitive or negative side of cell 6' shields the sensitive portion of cell 6' from light not intercepted by element 6. Thus, cell 6' is not radiantly excited. The light energy striking the photocell element 6 causes current to flow in a given direction in the coil 2. Interaction between the magnetic field of this current and the field established by the permanent magnet 1 provides a torque to rotate the coil 2 and, with it, the entire armature assembly about the axis 5. Armature rotation through 180° interchanges the positions of the photocell elements 6 and 6' so that the sensitive face of the element 6' is illuminated. Consequently, recalling that the elements 6 and 6' are connected with opposite polarity to the coil 2, the current in the coil 2 is reversed, effectively commutated, and the continuous rotation of the armature 4 is sustained.

This first embodiment of the invention is adapted to driving a motor by illumination substantially normal to the axis of rotation of the motor. To commutate the light energy, it employs alternatively the shielding ability of the insensitive side of the individual photocell and the physical interposition of a companion photocell in the path of light energy.

Figure 3:
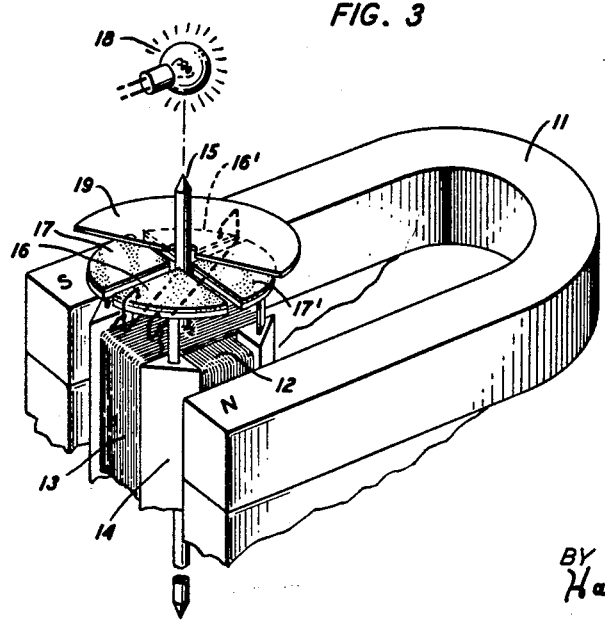
Fig. 3 shows a mechanical rearrangement of the motor of Fig. 1.

Fig. 3 shows a variation of the motor of Fig. 1 for utilizing illumination parallel to the axis 15 of rotation of an armature 14. In this embodiment the photocell pairs 16 and 16', 17 and 17' are connected to companion coils 12 and 13 in the fashion of Fig. 2. The photocells are arranged, however, circumferentially about the axis 15 in a plane normal to this axis 15 such that the sensitive surfaces are always oriented towards the axial source of illumination, e.g., a lamp 18. A shield 19 is provided to shade one-half of the photosensitive surfaces from this illumination. A magnet 11 corresponds to that of Fig. 1. As in the first embodiment, illumination of the cell 16 induces a torque rotating the armature 14, and with it cell 16, until cell 16 is shaded by the shield 19 and cell 16' is illuminated thus effecting a commutation of the light energy. Reversal of the current in coil 12 is obtained, as previously described, by this commutation of the light energy. Motor rotation of the armature 14, powered by an axial source of illumination, is so maintained.

From the above discussion of two motor forms of the invention described, and consideration of known principles of physics, it is clear that the torque developed in these forms of the invention is relative between the magnet and the coils. It is readily apparent to one skilled in the art that a simple rearrangement of components leads to a stationary coil-photocell system with a rotating magnet.

In the preceding figures there have been described electric motors whose ultimate functioning is similar to that of conventional motors despite the fact, however, that they utilize unconventional power sources. Next for consideration is an embodiment of the invention wherein radiant energy is not only employed as a power source but as an intelligence or control source as well.

Fig. 4 shows this form of the invention, a "sunflower" drive. An assembly, consisting of three pairs of photocells 26, 27, and 23, an armature 24 and windings 22, arranged in a fashion described in the discussion of Fig. 1, is mounted on a shaft 25 for rotation relative to a base 29. A radiant energy source 68 provides illumination for the three pairs of photocells through a transparent shield 70, constructed of any of the well known transparent structural materials, for example, glass. Fixed to the shaft 25 is the first gear of a train 30 through which shaft 25 rotates a housing 31 relative to the base 29 at a rotational speed about $1/100$ that of the shaft 25. The housing 31 supports the field-establishing permanent magnet 21 rigidly. Hence the magnetic field necessary for motor rotation of the armature 24 is caused to rotate slowly with respect to the base 29. This slow rotation of the magnetic field under the influence of the rotating armature 24 is the essence of the "sunflower" drive. Its detailed functioning can best be understood by reference to Fig. 5.

Fig. 5 diagrammatically represents a plan view of two photocells 26 and 26' connected with opposite polarities to a coil 22 in the fashion of Fig. 2. The coil is mounted for rotation about an axis 25 perpendicular to the plane of the drawing. The photocells 26 and 26' are mounted oppositely to face their sensitive surfaces away from the axis 25. Opposite poles 21 and 21' of a permanent magnet provide a magnetic field linking the coil 22. A lamp 28, shown in alternative positions 28, 28', and 28" for convenience of discussion, provides illumination for the photocells. In position 28 the lamp provides illumination normal to the magnetic field. Photocell 26 is illuminated to send current into the right side of the coil 22. Such current, interacting with the magnetic field shown, initiates a clockwise rotation of the coil 22. This rotation is sustained as photocell 26' is illuminated in the manner discussed in the consideration of Fig. 1.

But with the lamp at position 28", instead of 28, an opposite, counterclockwise rotation of coil 22 is initiated and sustained. Simple extension from these illustrative situations makes it clear that movement of the lamp 28 across the axis of the magnetic field makes for reversal of rotation. With the lamp on the axis of the magnetic field, i.e., in the position 28', there is no torque applied to the coil 22. This is because, with the coil 22 oriented as shown with respect to the magnet 21, no illumination falls on the sensitive faces of either of the photocells 26, 26'. Thus no current is induced in coil 22. With the coil rotated ninety degrees from the illustrated position, there is no torque on the coil, despite full illumination of either of the photocells, for the forces on the individual conductors are directed toward the axis 25 of rotation of the coil 22. Mathematical analysis verifies what is clear from the illustration that, with the arrangement of photocells with respect to the coil as shown, a stable minimum position of zero average torque is reached when the source of illumination lies on the axis of the magnetic field. Similarly, with other arrangements of photocells with respect to the coil, there is a specific orientation of illumination with respect to the axis of the magnetic field which yields a zero average torque for a complete rotation of the coil. On either side of this specific orientation oppositely directed torques are developed.

Returning now to Fig. 4, as the armature 24 rotates under the influence of an illuminating source, the gear train 30 drives the housing 31, and with it the magnet 21, until the specific orientation of the magnetic field, relative to the direction of illumination, which yields a zero torque is reached. Here, rotation of the armature 24 stops. Any movement of the illuminating source from this specific orientation initiates armature rotation in a direction responsive to the direction of movement of the source. The magnetic field then follows the illuminating source in the manner of the sunflower.

The usefulness of this invention appears more clearly when considered in the light of advancing technology. Recently, for example, devices have been announced for conversion of solar energy to provide a possible major source of electrical power. Such devices, to be most efficient, should properly be directed toward the sun. To provide most economical power, this orientation should be automatically accomplished and with little maintenance. As described above, Fig. 4 shows a form of this invention that is an exact match to these requirements.

Fig. 6 shows an oscillatory form of the invention. One end of a pendulum 34 is fixed at right angles to a magnetically permeable crossbar 38 and is mounted on a pivot 35 fixed to a frame 37. Photocells 36 and 36' are fixed to frame 37 in positions to be alternately shielded by the pendulum bob 34' from illumination normal to the plane of the drawing by displacements of the pendulum 34 from its quiescent vertical position. These photocells are connected, as detailed in Fig. 7, with opposite polarity to the coils 32 and 32' which, inturn, are wound and connected for series-aiding and fixed to frame 37 in position to permit oscillations of the crossbar 38 within them. Connected in parallel across the coils 32 and 32' is a capacitor 39.

Two permanent bar magnets 33 and 33' are also fixed to frame 37 arranged with like magnetic polarity near the opposite ends of the crossbar 38 and perpendicular to it in its horizontal position. Assuming the pendulum displaced to the left, photocell 36 is shielded and photocell 36' is illuminated by a light placed on a normal to the plane of the drawing. Crossbar 38 serves as a path for magnetic flux from the north pole of magnet 33 to the south pole of magnet 33'. Current induced by the illumination of photocell 36' passes through the coils 32 and 32' in such a direction as to oppose the magnetic flux flowing in crossbar 38. Hence, to the well-known restoring torque exerted on a pendulum by gravity, is added an additional torque exerted by the light-excited current. To utilize the photocells' energy efficiently, it is advantageous that the electrically exerted torque on the system be phased correctly with respect to the displacement of the pendulum. The capacitor 39 is suitably chosen to provide this phase relationship. As a result of gravitationally and electrically originated torques, the pendulum is driven to the right, shielding photocell 36' and reversing the electrical current in the coils 32 and 32'. Thus the frictional losses of the pendulum are compensated by the photocell energy and oscillation is sustained indefinitely at a high amplitude.

Fig. 8 shows a magnetically permeable tuning fork 41 to the top and bottom tines 43 and 43' of which are fixed screens 44 and 44' respectively. The screens 44 and 44' are constructed and fixed to the tines 43 and 43' so that, in the quiescent state of the fork 41, the screens' apertures are half coincident in a vertical sense. The coincidence of the screens' apertures decreases as the tines 44 and 44' move together and, conversely, increases as the tines 44 and 44' move apart. Mounted on the opposite side of the screens 44 and 44' from a lamp 48 is a photocell 46 connected in parallel with a coil 42 and a phase adjusting capacitor 49. The coil is fixed so that its axis lies parallel to the natural vibrational motion of the tuning fork 41. As the quiescent fork 41 allows light from the lamp 48 to pass through the half opened aperture of screens 44 and 44', photocell 46 is illuminated to drive current through coil 42. This current generates a magnetic field which induces oppositely poled magnetism in the tines 43 and 43'. Accordingly the tines 43 and 43' are drawn together towards the coil 42 and the screen apertures are closed to decrease the illumination of the photocell 46. Current accordingly decreases in coil 42 until the natural elasticity of the fork structure overcomes the electromagnetic force and the tines 43 and 43' are driven towards and through their quiescent position thus increasing illumination of photocell 46. Natural oscillation of the tuning fork continues in this fashion with all damping forces counteracted by the photocell-converted light energy.

From the foregoing descriptions it is clear that the spirit of the invention may be embodied in many forms. Those forms shown are illustrative of the fact that the invention is capable of powering and controlling in varied environments both rotational and oscillatory motions which are the fundamental components of all mechanical motions.

What is claimed is:

1. An electric motor for converting radiant energy from an illuminating source to mechanical energy which comprises an armature mounted for rotation about an axis, a first photocell and a second photocell each having a first surface responsive to light energy incident thereon to generate electrical energy and a second surface insensitive to said energy, said photocells being mounted on said armature to face said responsive surfaces in substantially opposite directions from said axis and to dispose said responsive surfaces for illumination by said source over less than the full cylindrical area generated by rotation of said surfaces about said axis, a coil having a first terminal and a second terminal and being wound on said armature, said first terminal being connected to the responsive surface of said first photocell and to the insensitive surface of said second photocell, and said second terminal being connected to the insensitive surface of said first photocell and to the responsive surface of said second photocell, whereby radiant energy from said source incident upon said motor causes a current to flow in said coil in a direction dependent upon the rotational position of said armature, and means for establishing a magnetic field inductively linking said coil, whereby current flowing in said coil interacts with said magnetic field to apply a unidirectional torque to said armature.

2. Apparatus for converting radiant energy from a source into electromechanical energy which comprises, a transducer having a surface responsive to radiant energy incident thereon to generate electrical energy, an electrically conductive winding connected in series with said transducer, means for establishing a magnetic field in inductive relation to said winding and with respect to which means said winding is free to move in a cyclic path, and means responsive to movements of said winding relatively to said field-establishing means for varying the incidence of radiant energy from said source upon said surface, whereby radiant energy incident upon said surface develops a variable current in said winding to interact with said field thereby to apply a force to said winding in a direction to support cyclic movements of said winding.

3. Apparatus as set forth in claim 2 wherein said winding is free to rotate about an axis.

4. Apparatus as set forth in claim 2 wherein said transducer comprises a photocell.

5. Apparatus set forth in claim 3 wherein said transducer comprises a first photocell and a second photocell mounted oppositely with respect to said axis, each of said photocells having a surface responsive to light incident thereon to generate electrical energy and a second surface insensitive to said incident light, and wherein said winding comprises a first terminal and a second terminal, each of said terminals being connected respectively to a responsive surface of one of said photocells and to an insensitive surface of the other of said photocells.

6. Apparatus as set forth in claim 2 wherein said energy incidence varying means comprises a shield opaque to said radiant energy and means for interposing said shield between said source and said transducer surface.

7. Apparatus as set forth in claim 2 wherein said field-establishing means comprises a magnetically permeable tuning fork, said transducer comprises a photocell, said winding being fixedly mounted parallel to the natural vibrational motion of said tuning fork in magnetizing proximity thereto and wherein said energy incidence varying means comprises parallel screens fixed to opposite tines of said tuning fork respectively and disposed between said source and said transducer, whereby, upon illumination of said photocell by said source, a current flows in said winding thereby to magnetize said tuning fork and, by interaction with the resultant magnetic field, to induce and support vibratory motion in said tuning fork.

8. Apparatus for converting the radiant energy of a source into electromechanical energy which comprises a transducer having a surface responsive to radiant energy incident thereon to generate electrical energy, a shaft disposed along an axis and mounted for rotation thereabout, an electrically conductive winding connected in series with said transducer and fixedly mounted on said shaft, means for establishing a magnetic field inductively linking said winding, means coupling said shaft with said field-establishing means for rotating said field-establishing means about said axis in an amount proportionate to the rotation of said shaft, and means for varying the incidence of radiant energy on said surface in accordance with rotational movement of said shaft about said axis, whereby said field-establishing means are rotated about said axis to an orientation determined by said incident energy.

9. In apparatus for converting the radiant energy of a source into mechanical energy the combination which comprises a base, a transducer fixedly mounted on said base and having a surface responsive to radiant energy incident thereon to generate electrical energy, a current conductive winding fixed to said base and connected in series with said transducer, a pendulum mounted on said base for oscillation and comprising means for varying the incidence of radiant energy upon said transducer in relation to a displacement of said pendulum, whereby radiant energy incident upon said transducer surface causes a current to flow in said winding in an amount related to the position of said pendulum, and means comprising a member fixed to said pendulum for establishing a magnetic field inductively linking said winding, whereby said current interacts with said magnetic field to apply a force to said pendulum.

10. Apparatus as set forth in claim 9 and in combination therewith a reactive element connected in circuit with said winding, whereby current flowing in said winding is phased in an energy conserving relationship with displacements of said pendulum.

11. Apparatus for converting radiant energy from a source into electrical energy which comprises a transducer having a surface responsive to radiant energy incident thereon for generating electrical energy, means for converting said electrical energy to cyclic mechanical energy, means actuated by mechanical energy for varying the incidence of radiant energy on said transducer surface and means for applying said cyclic mechanical energy to said energy-incidence-varying means in a time phase adapted to conserve said cyclic mechanical energy.

References Cited in the file of this patent

UNITED STATES PATENTS 2,669,635    Pfann _____ Feb. 16, 1954
2,710,371    Baensch _____ June 7, 1955